United States Patent
Streiff et al.

(10) Patent No.: US 6,695,389 B2
(45) Date of Patent: Feb. 24, 2004

(54) STRUCTURAL FRAME OF A VEHICLE SUPERSTRUCTURE

(75) Inventors: Samuel Streiff, Windisch (CH); Gino Dallo, Lenzburg (CH)

(73) Assignee: Alcan Technology & Management Ltd., Neuhausen (CH)

( * ) Notice: Subject to any disclaimer, the term of this patent is extended or adjusted under 35 U.S.C. 154(b) by 0 days.

(21) Appl. No.: 10/223,189

(22) Filed: Aug. 16, 2002

(65) Prior Publication Data

US 2003/0034671 A1 Feb. 20, 2003

(30) Foreign Application Priority Data

Aug. 17, 2001 (EP) ............................... 01810798

(51) Int. Cl.[7] .................. B61D 17/08; B62D 31/02; F16B 7/18
(52) U.S. Cl. .................. 296/178; 296/203.01; 296/29; 403/256; 256/59; 105/397
(58) Field of Search .................. 296/191, 187, 296/203.01, 203.03, 29, 30, 187.12, 178; 403/331, 256, 257, 258, 260; 256/59, 65.01, 65.02, 65.03; 105/396, 397, 401, 404, 409

(56) References Cited

U.S. PATENT DOCUMENTS

| | | | |
|---|---|---|---|
| 1,236,202 A | * | 8/1917 | Murnane ...................... 52/770 |
| 2,247,273 A | | 6/1941 | Blomberg |
| 2,345,650 A | * | 4/1944 | Attwood ...................... 403/21 |
| 5,116,161 A | * | 5/1992 | Faisst ........................ 403/231 |
| 5,287,813 A | | 2/1994 | Hanni et al. |
| 5,613,726 A | * | 3/1997 | Hobbs et al. ............... 296/181 |
| 6,334,642 B1 | * | 1/2002 | Waldeck et al. ............. 296/29 |
| 6,616,217 B1 | * | 9/2003 | Robinson .................... 296/178 |

FOREIGN PATENT DOCUMENTS

| | | |
|---|---|---|
| EP | 0 232 832 | 8/1987 |
| EP | 0 838 384 | 4/1998 |

* cited by examiner

*Primary Examiner*—D. Glenn Dayoan
*Assistant Examiner*—Patricia L. Engle
(74) *Attorney, Agent, or Firm*—Bachman & LaPointe, P.C.

(57) ABSTRACT

A framework of a vehicle superstructure, in particular for rail or road bound vehicles for passenger transport, having a side-wall structure containing an inner side facing the interior of the vehicle superstructure and an outer side facing outwards and longitudinal sections (1) and vertical sections (101) forming cross-like connecting places, whereby at one, several or all cross-like connecting places made between longitudinal sections (1) and vertical sections (101), the longitudinal section (1) is continuous and crosses behind the vertical section (101) on the inside at least in part and is releasably attached to the vertical section (101). For the purpose of releasable connection of the longitudinal section (1) to the vertical section (101), the longitudinal section (1) contains at least one undercut longitudinal groove (2) which runs in the longitudinal direction and crosses behind the vertical section (101).

22 Claims, 7 Drawing Sheets

//STRUCTURAL FRAME OF A VEHICLE SUPERSTRUCTURE

BACKGROUND OF THE INVENTION

The present invention relates to a framework, in particular a structural frame of a superstructure for a vehicle, in particular for rail or road bound vehicles for passenger transport, having a side-wall structure containing an inner side facing the interior of the vehicle superstructure and an outer side facing outwards and longitudinal sections and vertical sections forming cross-like connecting places.

As a rule, the side-wall structures of above mentioned vehicle superstructures are made up of sections that run in the longitudinal and vertical directions and are joined together at their—usually cross-like connecting places by means of welding, bolting or riveting. By longitudinally oriented sections, hereinafter referred to as longitudinal sections, are meant in particular longitudinal profiled rods, parapet sections and strut-shaped sections such as floor struts, base struts, roof and middle struts. By vertically oriented sections, hereinafter referred to as vertical sections are meant in particular profile rods, profile posts such a door posts, vertical columns such as side-wall columns and window posts. The window posts are situated in the region of the window glazing and divide the window front into segments or areas. The door posts serve the purpose of delimiting the sides of the entry openings in the side-wall structure.

Superstructures for omnibuses and motor buses of the conventional kind mainly exhibit a structural frame which is flush with its outer contour, onto which outer cladding elements such as aprons and blinds and the glazing of the window areas are mounted. In the present description, by "outer side" is meant lying or arranged towards the outside of the superstructure and by "inner side" is meant lying or arranged towards the inner side of the superstructure.

The above mentioned longitudinal and vertical sections in the side-wall structure are structural elements of the vehicle superstructure. They contribute significantly to the rigidity and strength of the superstructure. The requirements made of the mechanical properties of the connecting places or joints between the longitudinal and vertical sections are, therefore, also accordingly high.

Conventional side-wall structures contain as a rule roof struts running in the region of the roof, floor struts or base struts running in the region of the floor, and vertical side-wall posts. Further, in order to reinforce the superstructure, the side-wall structures also contain longitudinal sections such as middle-strut sections or parapet sections between the floor struts and the roof struts.

The longitudinal and vertical sections of the side-wall structure normally lie flush on the outside in a plane, the so called side-wall plane. The connections between the longitudinal and vertical sections are therefore as a rule cross-like in shape i.e. one section is always interrupted at the connection and lies head on with the un-interrupted crossing section. Both sections are screwed or welded together e.g. by means of corner connecting pieces.

In a first known version of side-wall structure the longitudinal sections viz., the roof, central and floor struts at the joints made with the vertical sections, namely the wall columns, are in the form of continuous longitudinal sections which are interrupted only at the openings for the doors. Each of the vertical sections is interrupted at the joining places, and lie head-on in contact with a long side of the longitudinal sections and are screwed or welded to these by means of corner connecting pieces.

Also known are side-wall structures in which the vertical sections are continuous and, at the cross-like joints, the longitudinal sections are in the form of interrupted sections. In that case the ends of the lengths of longitudinal sections lie head-on against a long side of the vertical sections and are joined by screwing or welding to them with the aid of corner connecting pieces.

Further side-wall structures are known in which both the longitudinal and vertical sections are continuous at the cross-like joints, whereby in that version the vertical sections run behind the longitudinal sections on the inside. That side-wall structure, however, does not form a flush plane on the outside and if repairs are necessary, the vertical sections have to be dismantled from their crossed position at the back—a complicated, expensive process. It has also been found that such side-wall structures have excessively thick walls which, for legal reasons regarding maximum overall vehicle width and minimum interior width of vehicle, are difficult to realise.

Also known are side-wall structures in which cross-like connections are made between longitudinal and vertical sections, both of which are continuous and feature interruptions in the form of machined-out recesses. These recesses, however, require additional fabrication steps and therefore complicate the production process.

The object of the present invention is to provide a vehicle construction having a side-wall structure that is characterised by way of good strength and rigidity, great ease of assembly and repair, and large freedom in design.

SUMMARY OF THE INVENTION

The foregoing object is achieved by way of the invention in that, at one several or all cross-like connecting places between longitudinal and vertical sections, the longitudinal section is continuous and the longitudinal section crosses behind the vertical section on the inside at least in part and is releasably attached to the vertical section and, for the purpose of releasable connection of the longitudinal section to the vertical section, the longitudinal section contains at least one undercut longitudinal groove.

In the present description "cross-like" means that both sections cross at an angle which is preferably but not essentially 90° or about 90° (degrees of angle). The sections may also cross each other at an angle (smaller angle) e.g. of 45°–90°. It is self explanatory that the vertical sections in this context need not be, but are preferably, vertical to the horizontal, and the longitudinal sections need not be, but are preferably, horizontal. The vertical sections may e.g. arranged away from the vertical by an angle of up to 45°, and the longitudinal sections may likewise be arranged away from the horizontal by an angle of up to 45°.

In the present description "crossing at the back" means that the section in question runs without interruption i.e. continuously behind the other section it crosses.

The longitudinal section or sections preferably contain one, two or more parallel undercut longitudinal grooves or C-shaped undercut grooves situated on the outside and running in the longitudinal direction of the section, whereby the undercut groove or the vertical section or sections cross at the back at the cross-like connecting places and rest against the inner face of the vertical section or sections. The mentioned longitudinal grooves serve the purpose of releasable connection to the vertical section. If two or more of the longitudinal grooves are foreseen in the longitudinal section, then it is possible to achieve higher strength and rigidity in the joint. In the present description "longitudinal" grooves means grooves running in the longitudinal direction of the section and advantageously running parallel to its sides.

At the said cross-like connecting place the longitudinal section and the vertical section are joined together, preferably by means of one or more screw-type connections, whereby the screw-type connection comprises a screw which passes through the vertical section or a connecting element and engages the threaded hole in an insert introduced into the undercut longitudinal groove of a longitudinal section. When the screw has been tightened, the insert engages in a clamping manner behind the undercut groove thereby fixing the vertical section to the longitudinal section.

In this version—and in all of the following versions and further developments thereof according to the invention which employ the above mentioned insert—the insert is advantageously in the form of a parallelogram-shaped plate or clamping piece that can be rotated in the undercut longitudinal groove of the longitudinal section. Further, the insert may exhibit one or more threaded holes to accommodate one or more screws. The insert may also be in the form of a strip, in particular a prism-shaped strip, which can be introduced sideways into the undercut groove. The insert strip exhibits one, preferably two or more holes, preferably threaded holes, to accommodate one, preferably two or more screw-type connections. The insert strip may e.g. be dimensioned and arranged such that it crosses the vertical sections at the rear and accommodates the screw-type connections at both sides of the vertical section.

In a particular design of the invention the vertical section crosses the longitudinal section without interruption, whereby in that case the longitudinal section crosses the back of the vertical section completely. The vertical section, however, may be interrupted at the cross-like connection and its end face may abut the longitudinal section in a cross-like manner. Whereby the vertical section crosses the longitudinal section at least partly i.e. the longitudinal section crosses behind the vertical section at least partly and with at least one undercut longitudinal groove.

In a preferred version the longitudinal section contains at least two outer side faces that run parallel to the side wall plane and are displaced with respect to each other vertical to the side-wall plane by a step running in the longitudinal direction of the section, whereby the side-face or side-faces displaced towards the interior of the vehicle body contains or contain at least one undercut longitudinal groove and crosses or cross behind the vertical section and, the side-face displaced towards the outer side of the vehicle lies flush with the outer side-face of the vertical section. The side-wall plane is thereby defined by the common aligned side-faces of the vertical sections.

In a particular further development of the invention one, and preferably both transverse side-faces of the vertical section running transverse, in particular perpendicular, to the side-wall plane may contain one. Two or more undercut longitudinal grooves. In this further development of the invention, the vertical sections may be connected to the crossing longitudinal section via known corner connecting elements. The attachment is made using screw type connections, whereby screws pass through the corner connecting element and engage in the threaded hole in the inserts which are introduced into the undercut longitudinal grooves in both the longitudinal section and in the vertical section. When the screw type connection is screwed tight, the inserts engage in the undercut longitudinal groove in a clamping manner thus fixing the vertical section via the corner connecting element to the longitudinal section. In this version the corner connecting element is oriented transverse, in particular perpendicular to the side-wall plane.

The corner connecting element may be in the form of a corner piece or angle piece. The corner piece may be a casting, welded part, forging or machined part. The corner connecting element may also be in the form of a sliding part which can be introduced sideways into the undercut groove, whereby the corner connecting element engages the undercut groove such that the corner element is fixed or anchored in the axis lying transverse to direction in which it was introduced and running through the longitudinal opening.

Examples of the above mentioned corner connections—which with respect to their mode of function can be used in the present invention—are described in the patent publications EP 0 136 264 A2, EP 0 671 566 B1 and EP 0 806 338 B1 to which reference is expressly made here.

The longitudinal and vertical sections are e.g. sections manufactured by an extrusion or pulltrusion process. The longitudinal and vertical sections are preferably made of metal such as iron or steel and in particular of a light weight metal such as aluminium and its alloys. Particularly suitable are extruded sections of a light weight metal, in particular aluminium or an aluminium alloy. Further, the sections may be made of shaped sheets.

The above mentioned sections may also be made of plastic, in particular fibre-reinforced plastic. Further, the sections may also be hybrid sections made up of longitudinal assembled, in particular adhesively bonded section parts, whereby a first section part is of metal, in particular aluminium and its alloys, and a second section part of fibre-reinforced, in particular fibre-glass or carbon fibre reinforced plastic.

The longitudinal and vertical sections may be open sections such as angle-shaped sections or channel-shaped sections, half open sections or closed sections such a single or multi-chamber sections.

The above mentioned vertical sections are in particular side-wall or window post sections and door posts. The longitudinal sections are sections that run longitudinally and form an upper and lower closure for the side-wall structure, such as roof struts or floor struts or base struts. Further, the longitudinal sections may also be longitudinal sections in the side-wall structure, such as central struts or parapet struts.

The strut sections, in particular the roof and floor strut sections, are preferably continuous i.e. uninterrupted over the whole length of the superstructure or vehicle length. The above mentioned strut sections, in particular the middle strut sections, may, however, in some cases be interrupted by one or more openings in the side wall structure for doors. In these cases the strut sections are at least continuous between the door openings.

The strut sections may contain places for connection purposes, in particular in the form of undercut longitudinal grooves for attaching interior elements such as lighting fittings, cables, pipes, air channels, covers, or for attaching seat frames or vehicle components. Further, the roof, floor or base struts may contain line-shaped connecting places for securing roof or floor structures.

Along their length, the strut sections preferably exhibit a uniform cross-section, especially over their places of connection. When installed, the strut sections preferably feature no machined areas or the like at the places where they cross and are joined to the vertical sections.

In a further development of the invention the roof and/or floor or base sections may be in the form of longitudinal sections which are angle-like in cross-section or as longitudinal sections with two flanges that are at an angle to each other, in particular a right angle. In that case one flange is preferably vertical and a second flange horizontal, whereby on the outside both section flanges preferably form a recess—preferably right angled recess—to accommodate the end part of one or more vertical sections. In a highly preferred further development of the invention the above mentioned angle shaped longitudinal section forms an outer side face which lies flush with the outer side face of the vertical section or sections. The above mentioned side face lies usefully on the horizontal section flange.

The cross-like connection places according to the invention lie to advantage between the parapet struts and the side-wall or window columns, between the roof struts and the window columns or door posts and between the floor struts and the side-wall columns or door posts.

In a preferred version of the invention the side-wall structure contains section struts in the form of a floor or base strut, a middle or parapet strut and a roof strut. Side-wall columns and window columns, and door posts, are provided transverse to these strut sections. The cross-like connection between the middle and parapet strut and the side-wall columns or window columns is characterised by way of the fact that the middle or parapet struts exhibits at least one, two or more undercut longitudinal grooves and is in the form of a continuous longitudinal section which is interrupted only by openings for doors. The middle or parapet strut crosses behind the side-wall or window columns, at least in part or completely, whereby at least one, two or more undercut longitudinal grooves cross behind the side-wall or window columns. The middle or parapet strut is to advantage in the form of a flat section i.e. the breadth of the section is at least twice the thickness of the section. Further, the middle or parapet section may be a T-shaped hollow section with a central elevated part and flanges featuring longitudinal grooves on both sides.

The side-wall and window columns may be in the form of vertical sections that are continuous or uninterrupted in the are of the above mentioned connecting places, whereby in the first case the middle or parapet strut crosses completely behind the side-wall or window column and in the second case partially cross behind the said columns.

If both the vertical sections and the longitudinal sections crossing behind the vertical sections at the cross-like joints are continuous, then the longitudinal sections are arranged such that their outer longitudinal side is displaced to the inside, as a result of which their is no common, flush outer face. For that reason profile-like attachment elements are to advantage mounted on the outer side face of the longitudinal section or sections. The main purpose of these is to provide a common, flush area on the side-wall structure. These attachment elements are dimensioned in height such that their outer face lies flush with that of the vertical sections. The said attachment elements are e.g. always arranged lying between two vertical struts. The attachment elements are employed in particular at the middle or parapet struts and if necessary at roof or floor or base struts. The attachment elements may also contribute to stiffening the longitudinal sections.

The attachment element is usefully attached to the longitudinal section by means of screws, whereby the screws engage in the threaded holes in inserts which are introduced into one or more parallel, undercut longitudinal grooves in the longitudinal section. The attachment element may, however, also be attached to the longitudinal section using other attachment methods such as welding, riveting, push-fit or adhesive bonding. In another version of the invention the attachment element may at the same time be a corner element joining the longitudinal section to the vertical section.

In a particular version of the invention the profile-like attachment element contains places for connection, in particular groove-shaped connecting places, to accommodate outer cladding elements, in particular for attaching panel-shaped elements or rubber seals for holding the panel-shaped elements and/or covering elements. The mentioned connecting places may be in the form of grooves, in particular undercut grooves, which are suitable to accommodate the said attachment elements by insertion or push-fit. Further, the attachment element may exhibit connecting places for mechanical shape-dependent connections such as clip-type or push-fit connections.

The profile-like attachment element is to advantage made of metal such as iron or steel and in particular of a light metal such as aluminium and its alloys. Especially suitable are extruded sections of a light metal, in particular of aluminium or an aluminium alloy. The profile-like built-on element may, however, be made of plastic, in particular a fibre-reinforced plastic such as a glass-fibre or carbon-fibre reinforced plastic.

The attachment element may be made from a solid section, open section, semi-hollow or closed section such as a single or multi-chamber hollow section.

Vehicle superstructures according to the invention find application in particular in buses such as omnibuses and e.g. low-floor buses. The vehicle superstructure is suitable both for long distance buses such as tour buses and for town buses e.g. for public transportation in towns.

BRIEF DESCRIPTION OF THE DRAWINGS

In the following the invention is explained in greater detail by way of examples and by reference to the accompanying drawings viz.

DETAILED DESCRIPTION

FIGS. 1a, 2a, 3a, 5a, 6a and 7a show, in cross-section, parts of the side-wall structure according to the invention, whereby the cross-sectional plane is perpendicular to the side-wall plane. In each case numeral I indicates the outer side of the vehicle superstructure while numeral II indicates the inner side of the vehicle superstructure. FIGS. 1b, 2b, 3b, 5b, 6b and 7b respectively show the related parts of the side-wall structure according to the invention in side view, whereby the side view in each case is from outside the side-wall towards the interior.

In order to provide an overview, the screw type connections shown in FIGS. 1, 2, 3, 5, 6, and 7 and described in the following are only shown schematically.

Figure 1A:
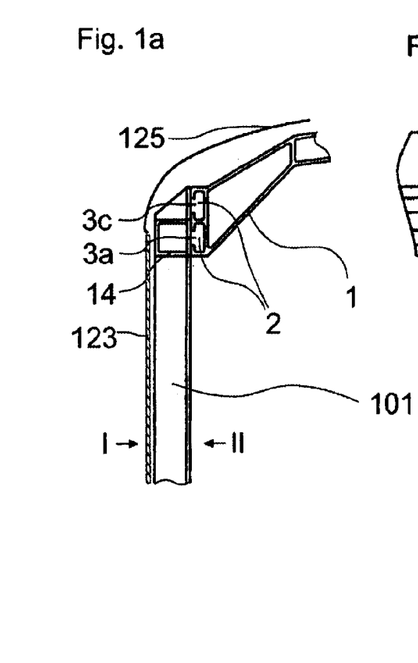
FIG. 1a: Cross-section through a connection between a vertical post and a roof strut along the line B—B of a side-wall structure shown in figure 1b.
Figure 1B:
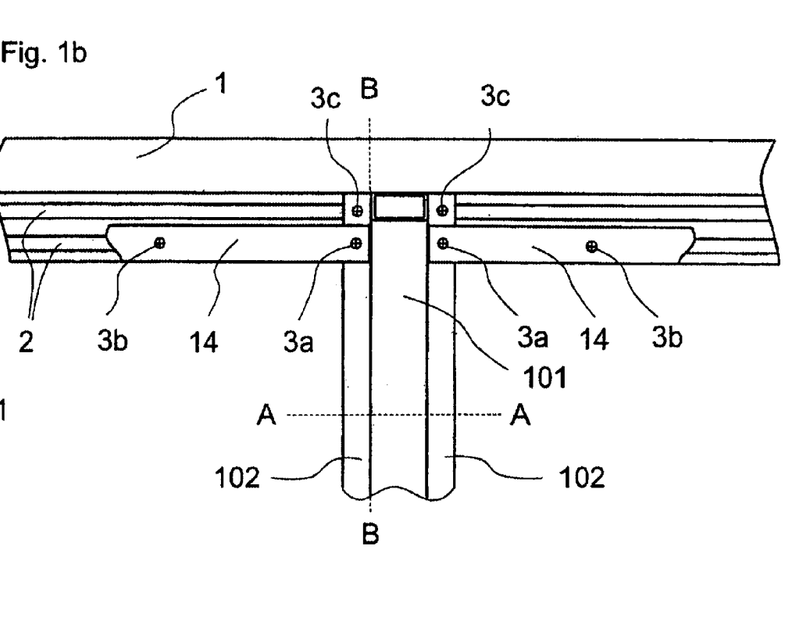
FIG. 1b: Side view of a connection between a vertical post and a roof strut.

FIGS. 1a and 1b show the joint made between a vertical post 101 and a roof strut 1 in a first version according to the invention. The roof strut 1 contains two undercut longitudinal grooves 2 on the outside that run parallel to each other, with which the roof strut 1 crosses behind the vertical post 101. The longitudinal grooves 2 lie against the inner side face of the vertical post 101. The vertical post 101 is in the form of a section with two flanges 102 at the sides (see FIG. 4 and the related description thereof), whereby the vertical post 101 is attached to the roof strut 1 by means of screw type connections 3a,c. The vertical section 101 is attached to the roof strut 1 at the longitudinal groove 2 at the lower end via attachment elements 14. Each of the attachment elements 14 runs between two vertical posts 101 and is attached to the roof strut 1 by means of screw connections 3b. The outer side face of the attachment element 14 and the vertical post 101 are flush, forming a common plane.

Figures 9A, 9B:
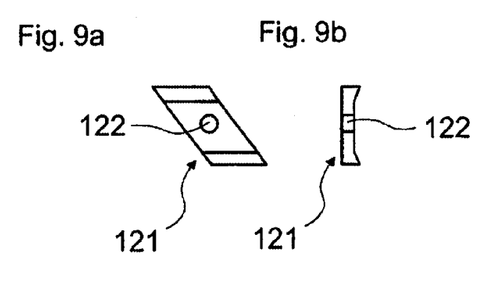
FIG. 9a: View of an insert.
FIG. 9b: Side view of an insert.
Figure 10:
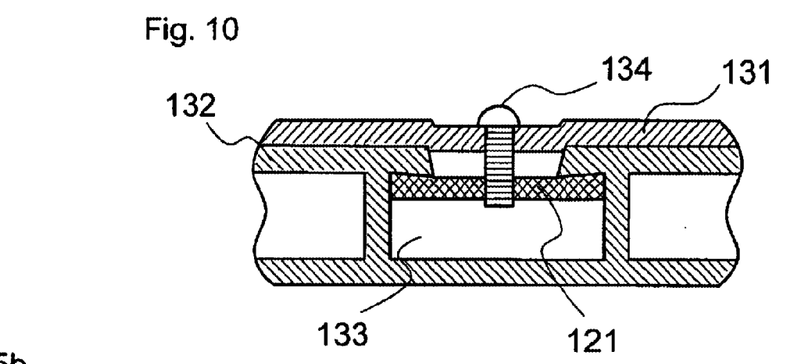
FIG. 10: Cross-section through a example of a screw-type joint made using an insert.

The above mentioned screw connections 3a,b,c contain the attachment elements 14 and/or the screws that penetrate the section flanges 102 and are screwed into the threaded holes in the inserts 121 introduced into the longitudinal grooves 2 (compare FIGS. 9 and 10 along with the related description).

The side-wall region according to FIG. 1a contains on the outside towards the roof cladding elements 125 and panel elements 123 which are attached to the outer wall via attachment elements 14.

Figure 2A:
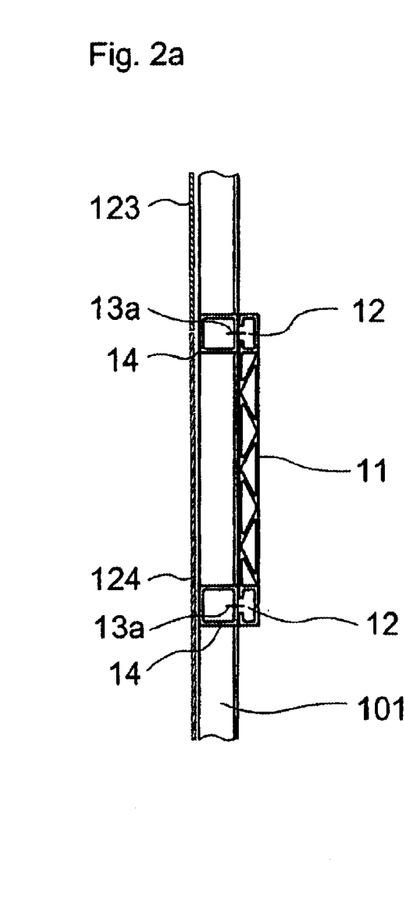
FIG. 2a: Cross-section, through a connection between a vertical post and a middle strut, along line C—C of a side-wall structure according to the invention as shown in FIG. 2b.
Figure 2B:
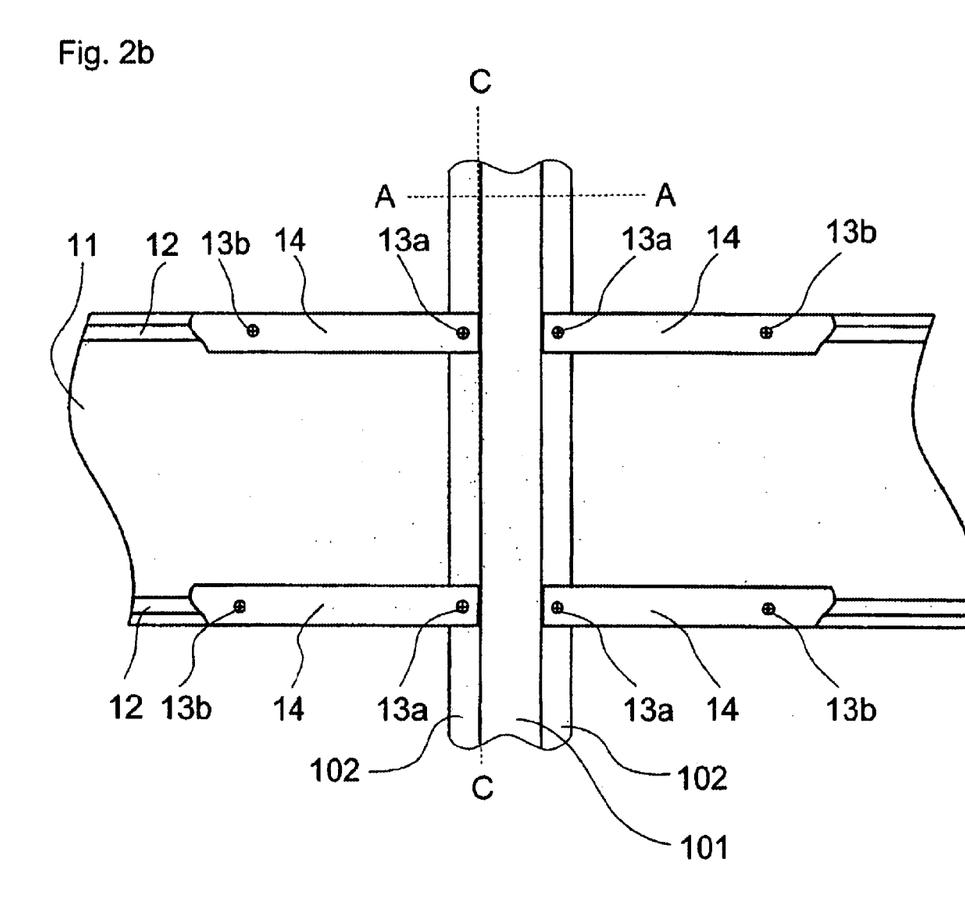
FIG. 2b: Side view of a connection between a vertical post and a middle strut.

FIGS. 2a and 2b show the connections made between the vertical post 101 and a middle strut 11 according to a first exemplified embodiment of the invention. The middle strut 11 contains two outer, peripheral, undercut longitudinal grooves 12 and crosses behind the vertical post 101 completely. The longitudinal grooves 12 lie against the inner side face of the vertical post 101. The vertical post 101 is in the form of section featuring two side flanges 102 (see FIG. 4 and the related description). The vertical post is secured to the middle strut 11 via attachment elements 14 by means of screw connections 13a.

Each of the attachment elements 14 runs between two vertical posts 101 and are attached to the middle strut 11 by means of screw connections 3b. The outer side faces of the attachment elements 14 and the vertical post 101 lie flush on a common plane.

The screw connections 13a,b contain the attachment elements 14 or the screws penetrate the attachment elements 14 and section flanges 102 and are screwed into the threaded holes in the inserts 121 introduced into the longitudinal grooves 12 (see FIGS. 9, 10 and the related description).

The side-wall element shown in FIG. 2 contains on the outside panel elements 123 which extend over the upper side-wall area and terminate in the region of the middle strut 11 and are detached from the subsequent cladding elements 124. The panels 123 and cladding elements 124 are attached to the outer wall via attachment elements 14.

Figure 3A:
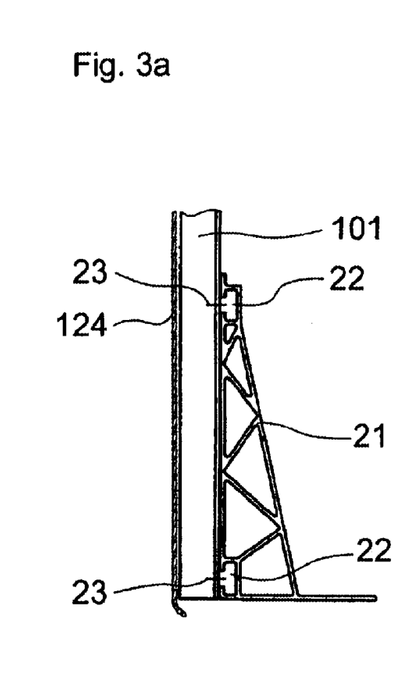
FIG. 3a: Cross-section through a connection between a vertical post and a floor strut or base strut, along line D—D of a side-wall structure according to the invention as shown in FIG. 3b.
Figure 3B:
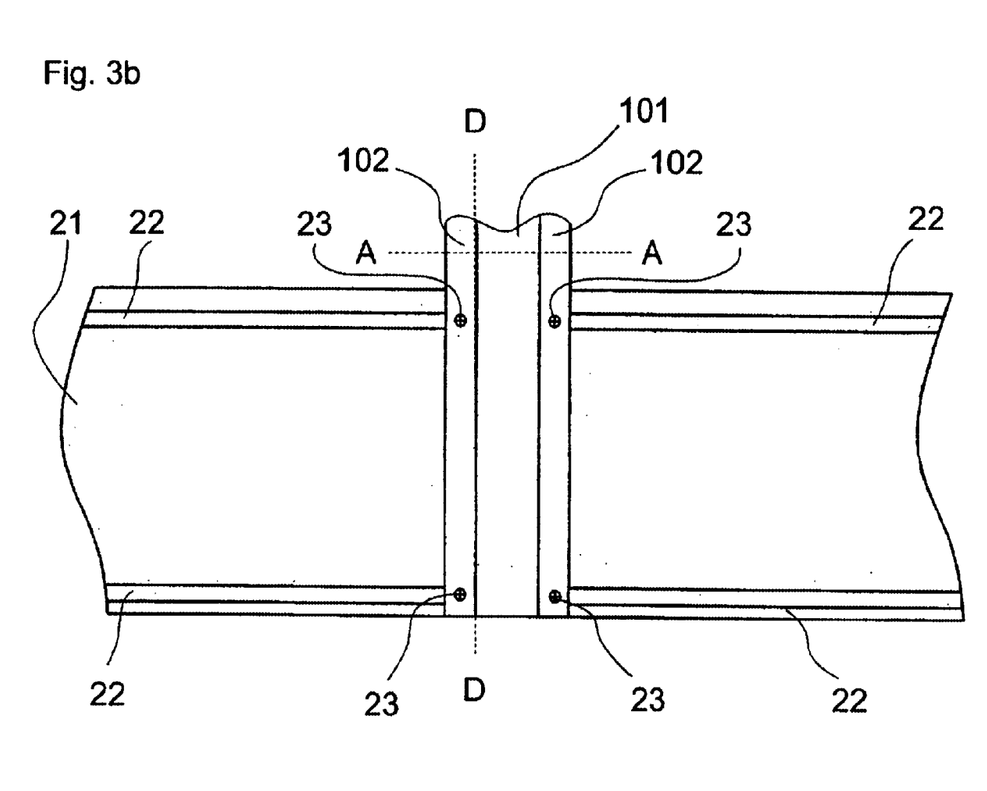
FIG. 3b: Side view of a connection between a vertical post and a floor strut or base strut.

FIGS. 3a and 3b show the connections made between a vertical post 101 and a floor strut 21 according to a first exemplified embodiment of the invention. The floor strut 21 contains two outer, peripheral undercut longitudinal grooves 22 and crosses behind the vertical post 101. The longitudinal grooves 22 lie against the inner face of the vertical post 101. The vertical post 101 is in the form of a section exhibiting two side flanges 102 (see FIG. 4 and the related description). The vertical post 101 is attached to the floor strut 21 via screw connections 23 penetrating the section flanges 102.

The vertical post 101 may also be attached to the floor strut via attachment elements, in a manner analogous to that shown in FIGS. 1 and 2. Reciprocally, the vertical sections shown in FIGS. 1 and 2 may be attached directly to the longitudinal section via their flanges 102 analogous to that shown in FIG. 3.

The screw connections 23 contain the screws that penetrate the section flanges 102 and are screwed into the threaded holes in the inserts 121 introduced into the longitudinal grooves 22 (see FIGS. 9 and 10 and the related description).

The side-wall region as shown in FIG. 3a contains cladding elements 124 on the outside. The cladding elements may be attached to the outer wall via attachment elements.

Figure 4:
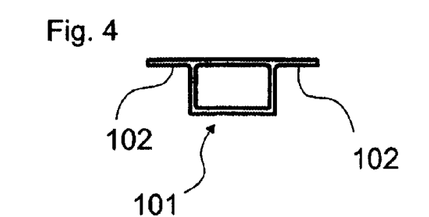
FIG. 4: By way of example a cross-section through a vertical section along line A—A as shown in FIGS. 1, 2 and 3.

The vertical post 101 may, as shown in FIG. 4, be in the form of a hollow section or an open section such as a hat-shaped or omega-shaped section. The vertical section contains, preferably two, side flanges or longitudinal strips 102 that lie in the same plane. The flanges 102 are e.g. in the form of an extension of the inner side face of the section and lie parallel to the side-wall plane. The vertical post 101 is e.g. made from an aluminium extrusion or from bent sheet material.

Figure 8:
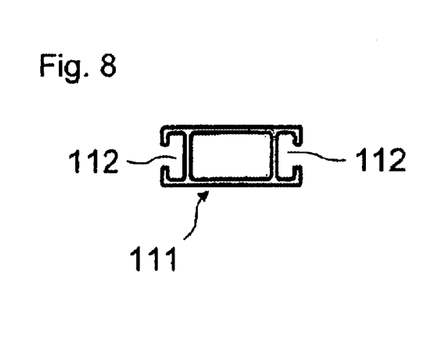
FIG. 8: By way of example, a cross-section of a vertical post along line E—E as shown in FIGS. 5, 6 and 7.

Another version of the vertical post 111 is shown in FIG. 8 as a hollow section, whereby each of its transverse faces, lying transverse to the side-wall plane, contains an undercut groove 112.

Figure 5A:
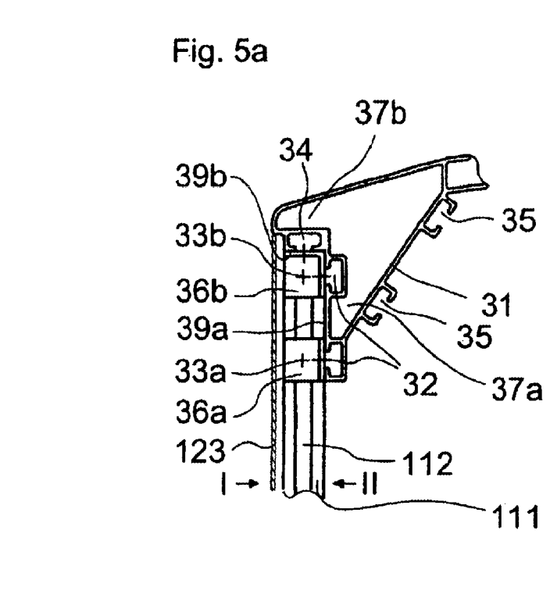
FIG. 5a: Cross-section through a connection between a vertical post and a roof strut along line F—F of a further side-wall structure according to the invention as shown in FIG. 5b.
Figure 5B:
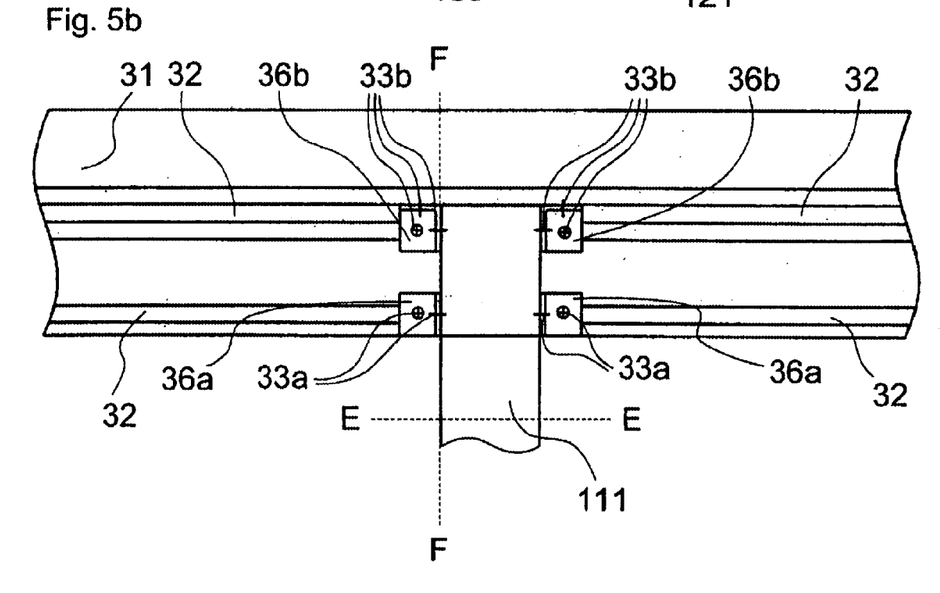
FIG. 5b: Side view of a connection between a vertical post and a roof strut.

FIGS. 5a and 5b show the connection made between a vertical post 111 and a roof strut 31 according to a second exemplified embodiment of the invention. The roof strut 31 contains a first, preferably extended flange 37a, which has its outer side face 39a arranged vertical or parallel to the vertical post 111. A second, preferably shortened, flange 37b is arranged on the outside, its side face 39b facing the vertical post 111 arranged horizontal or perpendicular to the vertical post 111, i.e. parallel to the end face of the vertical post 111, whereby the angular recess is formed by the two flanges 37a, 37b to accommodate the vertical post or posts 111. The roof strut 31 contains two peripheral longitudinal undercut grooves 32 in the outer face 39a. The roof strut 31 also contains an undercut longitudinal groove 34 in the face 39b of the second flange 37b facing the vertical post 111.

The first flange 37a crosses behind the vertical post 111 completely. The face 39a with its longitudinal grooves 32 lies against the inner face of the vertical post 111 and face 39b with its longitudinal groove 34 lies against the end face of the vertical post 111.

The vertical post 111 is in the form of a hollow section (see FIG. 8 and the related description) and contains an undercut groove 112 on each of its transverse faces running transverse to the side-wall plane.

The vertical post 111 is attached to the roof strut 31 by means of screw connections 33a, 33b containing corner joining elements 36a, 36b. In the region of the connection towards the floor screw connections 33a are provided on both sides of the vertical post section 111. The related corner joining elements 36a are fixed in the longitudinal groove 32 of the first flange 37a and in the longitudinal groove 112 of the vertical post 111. The attachment is made by means of screws which penetrate the corner joining element 36a and are screwed into the threaded hole in inserts 121 introduced into the longitudinal grooves 32, 112. (see FIG. 11 and the related description).

In the region of the connection towards the roof screw connections 33b are provided on both sides of the vertical post section 111. The related corner joining elements 36b are fixed both in the longitudinal grooves 32, 112 of the first flange 37a and the vertical post 111 and in the longitudinal groove 34 of second flange 37b. The attachment is made by means of screws which penetrate the corner joining element 36b and are screwed into the threaded hole in inserts 121 introduced into the longitudinal grooves 32, 112, 34.

The two corner joining elements 36b towards the roof may, however, also simply be anchored in the longitudinal grooves 32, 112 of the first flange 37a and the vertical post 111.

The roof struts 31 may also contain further undercut longitudinal grooves 35 on the inside for securing other structures.

The side-wall region as shown in FIG. 5a contains on the outside towards the roof panel-like elements 123 which are attached to the outer wall.

Figure 6A:
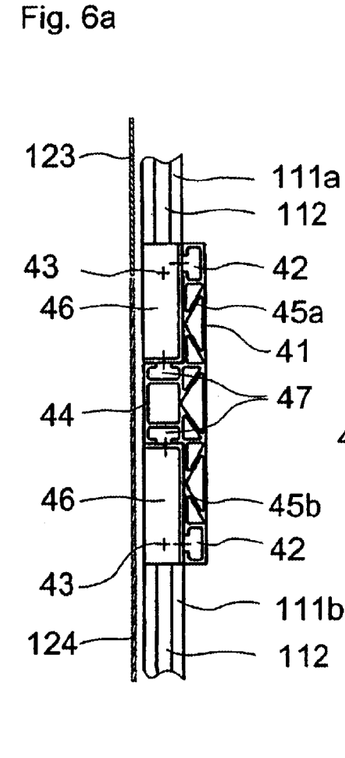
FIG. 6a: Cross-section through a connection between a vertical post and a middle strut along line G—G of a further side-wall structure according to the invention as shown in FIG. 6b.
Figure 6B:
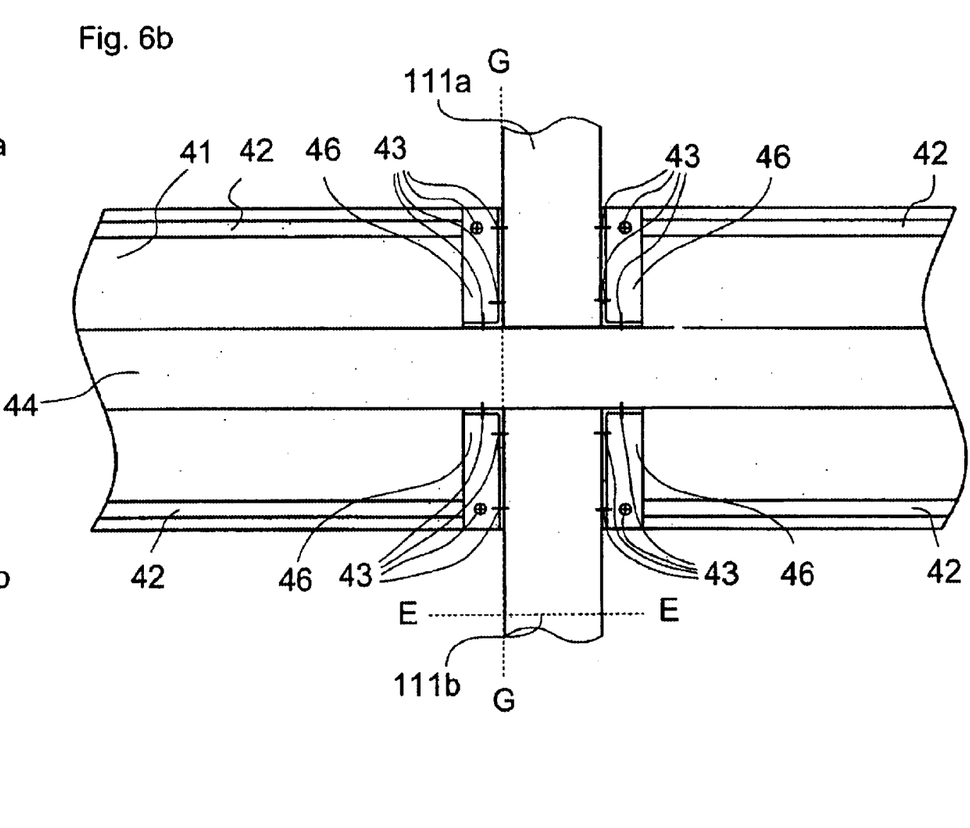
FIG. 6b: Side view of a connection between a vertical post and a middle strut.

FIGS. 6a and 6b show the connection made between a vertical post 111 and a middle strut 41 according to an exemplified embodiment of the invention. The middle strut 41 is T-shaped and contains a central, raised box-shaped part 44 and two flanges 45a and 45b at the sides with outer side face displaced towards the interior of the carriage structure. The middle strut 41 forms a uniformly flush inner side face.

The outer side face of the raised part 44 and the vertical post 111 are flush with each other. An undercut longitudinal groove 42 is provided on the outer faces of each of the flanges 45a, 45b.

The vertical post 111 is divided into two profile parts 111a, 111b, whereby the central raised part 44 of the middle strut 41 passes between the two parts 111a, 111b and the end faces of both parts 111a, 111b abut sideways on the central raised part 44. The middle strut 41, with both flanges 45a, 45b and the related longitudinal grooves 42, passes behind the inner side face of both parts 111a, 111b, as a result of which the longitudinal grooves 42 come to rest against the inner side face of the parts 111a, 111b.

The vertical post 111 or the profile parts 111a, 111b are in the form of hollow sections (see FIG. 8 and the related description) and contain an undercut longitudinal groove 112 on each of the two faces running transverse to the side-wall plane.

The profile parts 111a, 111b are attached to the middle strut 41 by means of screw connections 43 containing corner joining elements 46. The corner joining elements 46 on both sides of the parts 111a, 111b are in each case fixed, both in a longitudinal groove 42, 112 of a flange 45a, 45b and the part 111a, 111b and in the longitudinal groove 47 in the central raised part 44. The attachment is made via screws that penetrate the corner joining element 46 and are screwed into the threaded holes in the inserts 121 introduced into the longitudinal grooves 42, 112, 47.

Figure 7A:
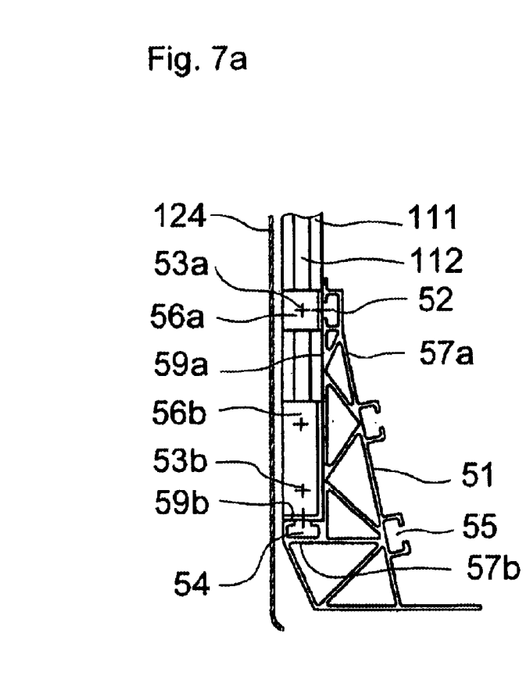
FIG. 7a: Cross-section through a connection between a vertical post and a floor strut or base strut along line H—H of a further structure according to the invention as shown in FIG. 6b.
Figure 7B:
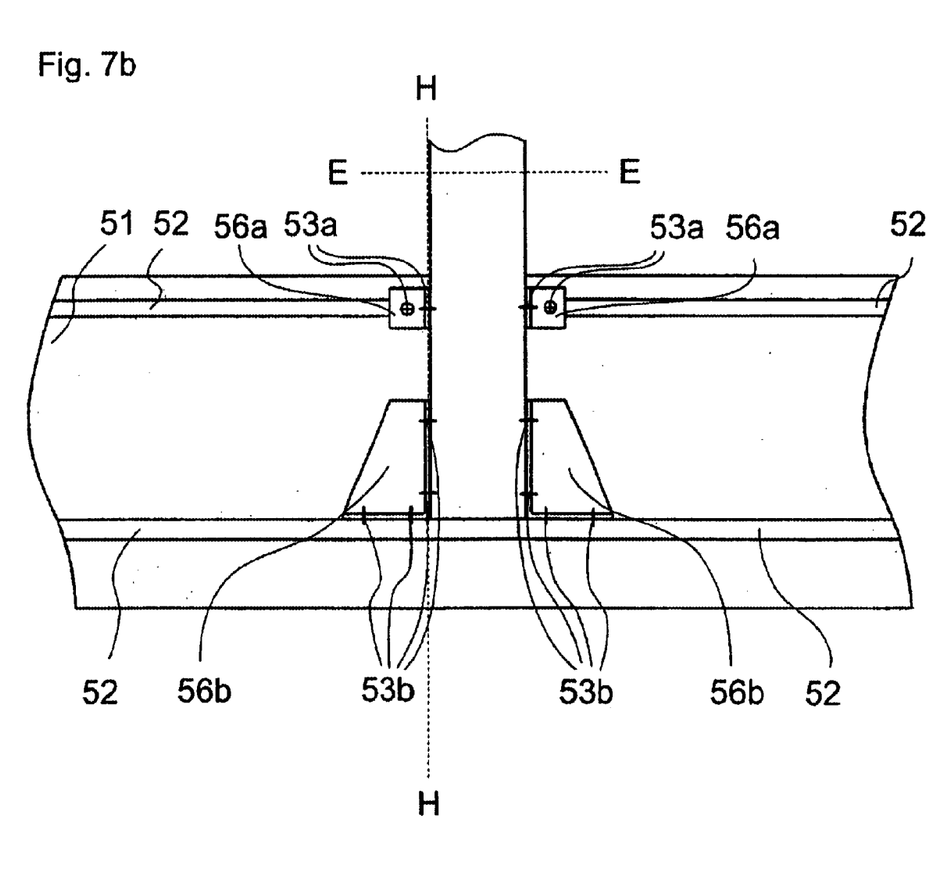
FIG. 7b: Side view of a connection between a vertical post and a floor strut or base strut.

FIGS. 7a and 7b show connection made between a vertical post 111 and a floor strut 51 according to a second embodiment of the invention. The floor strut 51 contains a first, preferably extended flange 57a which has its outer side face 59a arranged vertical or parallel to the vertical post 111. A second, preferably shorter flange 57b on the outside with its side face 59b facing the vertical post ill is arranged horizontal or perpendicular to the vertical post 111, whereby the recesses formed by the two flanges 57a, 57b is provided to accommodate the vertical post or posts 111. The floor strut 51 contains a longitudinal groove 52 in the outer face 59a of the first flange 57a in the region of the connection towards the roof and, with the outer side face 59a crosses behind the vertical post 111 completely. The floor strut 51 also contains an undercut longitudinal groove 54 provided in the side face 59b of the second flange 57b.

The side face 59a, has a longitudinal groove 52 on the inner side face of the vertical post 111 and the floor strut has a longitudinal groove 54 on the end face of the vertical post 111. The vertical post 111 is in the form of a hollow section (see FIG. 8 and the related description) and contains an undercut longitudinal groove 112 on each of its two transverse faces running transverse to the side-wall plane.

The vertical post 111 is attached to the floor strut 51 by means of screw connections 53a, 53b containing corner joining elements 56a, 56b. Screw connections 53a, 53b are provided on both sides of the vertical post 111 in the region of the connection towards the roof. The related corner joining elements 56a are fixed in the longitudinal groove 52 of the first flange 57a and in the longitudinal groove 112 of the vertical post 111. The attachment is made by the screws which penetrate the corner joining element 56a and are screwed into the threaded holes in the inserts 121 introduced into longitudinal grooves 52, 112 (see FIG. 11 and the related description).

Screw connections 53b are provided in the region of the connection towards the floor. The related corner joining elements 56b are fixed in the longitudinal groove 112 of the vertical post 111 and the longitudinal groove 54 of the second flange 57b. The attachment is in each case made via screws which penetrate the corner joining element 56b and are screwed into the threaded holes in the inserts 121 introduced into the longitudinal grooves 112, 54. The corner joining element 56b is therefore in this case arranged in a plane parallel to the side-wall plane.

If the first flange 57a does contain a second undercut longitudinal groove (not shown) in the region of the connection towards the floor and parallel to the longitudinal groove 52, then the corner joining elements 56b may be anchored in the longitudinal grooves 54, 112 of the second flange 57b and the vertical post 112 as well as in the additional second longitudinal groove.

The above mentioned screw connections 53 contain the screws that penetrate the corner connecting element 56 and are screwed into the threaded hole in the inserts 121 introduced into the undercut longitudinal grooves 52, 54, 112.

In a preferred version the crossing connection of the longitudinal and vertical sections in the roof region, middle region and in the floor region of the side-wall structure is made in accordance with FIGS. 1, 2 and 3 and the related description. In a further preferred version the crossing connection of the longitudinal and vertical sections in the roof region, middle region and in the floor region of the side-wall structure is made in accordance with FIGS. 4, 5 and 6 and the related description. The side-wall structure may, however, also contain only one or more of the individual section crossing arrangements or connections between sections shown in FIGS. 1–6.

FIGS. 9a and 9b show a preferred version of the insert 121 of a screw connection according to the examples shown in FIGS. 1, 2, 3, 5, 6 and 7 in plan view (FIG. 9a) and in cross-section (FIG. 9b). The insert 121 is in the form of a parallelo-gramm-shaped platelet with a central threaded hole 122. In order to make the screw connection, the screw 134, which penetrates the first joining part 131 i.e. the vertical post or a connecting element, is screwed into the threaded hole 122 in the insert 121. The long side of the insert 121 is introduced into the undercut groove 133 in the second joining part 132, i.e. the longitudinal or strut section. By screwing further, the short side of the insert 121 that has been put into place rotates into the undercut part of the longitudinal groove 133. The screw 134 can then be rotated further into the threaded hole 122 in the insert 121 which is now anchored firmly in the longitudinal groove 133, thus forming a secure connection (FIG. 10).

Figure 11:
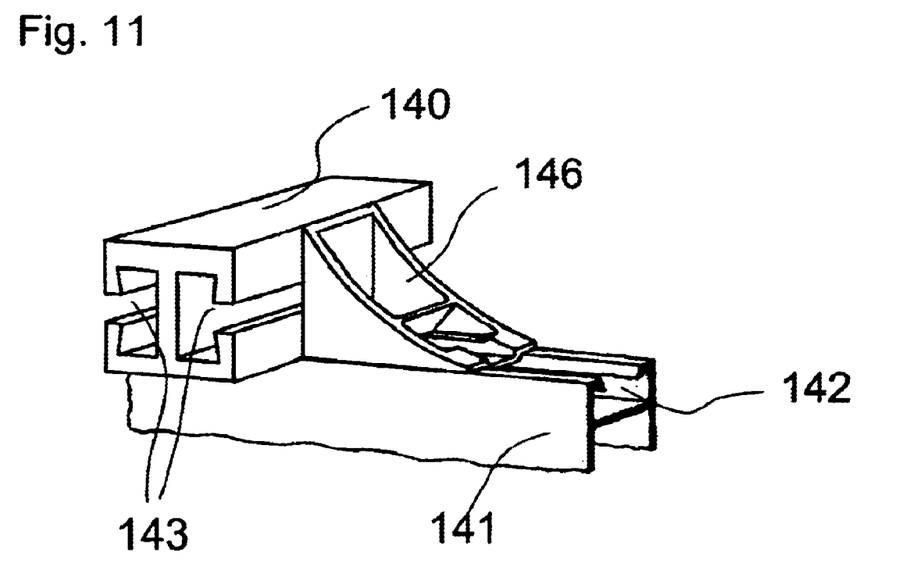
FIG. 11: Perspective view of a connection between a vertical section and a longitudinal section using corner joining elements.

FIG. 11 shows by way of example the manner of joining a vertical post and longitudinal section using a corner joining element such e.g. as is illustrated in FIGS. 5 and 7 with screw connections 33a, 53a. The vertical post 140 is crossed completely at the back by a longitudinal section 141 with undercut longitudinal groove 142. The vertical post 140 contains an undercut longitudinal groove 143 in each of the side faces lying transverse to the side-wall plane. A corner joining element 146 lies with one side face against the outer side face of the longitudinal section 141 and one side face against the transverse face of the vertical post 140. Screws pass through the corner joining element 146 and the inserts in both longitudinal grooves 142, 143 thus joining the vertical post 140 to the longitudinal section 141.

What is claimed is:

1. A framework of a vehicle superstructure, comprising a side-wall structure having an inner side plane facing the interior of the vehicle superstructure and an outer side facing outwards, the side-wall structure comprises a plurality of longitudinal sections including at least one connecting longitudinal section and a plurality of vertical sections including at least one connecting vertical section which form a plurality of cross-like connecting places wherein at least one of the cross-like connecting places comprises a connecting vertical section having an inner side face and a connecting longitudinal section having an outer side face which at least partially overlaps the inner side face of the connecting vertical section and is releasably connected thereto by connecting means, the connecting means comprises at least one undercut groove on the connecting longitudinal section which extends in a longitudinal direction of the connecting longitudinal section wherein at least a part of the undercut groove at least partially overlaps the connecting vertical section, wherein the plurality of vertical sections form side wall posts, window posts and door posts of the vehicle superstructure, and the plurality of longitudinal sections form roof, middle and floor struts of the vehicle form superstructure.

2. A framework according to claim 1, wherein the connecting vertical section is releasably attached to the connecting longitudinal section by means of at least one screw connection, the screw connection is in the form of at least one screw passing through the connecting vertical section and engaging in a threaded hole in an insert located in the undercut groove for anchoring the insert in place.

3. A framework according to claim 1, wherein the connecting longitudinal section contains two or more parallel undercut longitudinal grooves which overlap the connecting vertical section for the purpose of releasable attachment to the connecting vertical section.

4. A framework according to claim 1, wherein the longitudinal sections and vertical sections are extrusions.

5. A framework according to claim 1, wherein the connecting vertical section contains flanges which extend from the inner side face and run parallel thereto.

6. A framework according to claim 1, wherein the connecting vertical section is a hollow section having transverse side faces wherein an undercut longitudinal groove is located on each of the transverse side faces.

7. A framework according to claim 6, wherein the connecting vertical section is secured to the connecting longitudinal section by means of corner joining elements, whereby a plurality of screws pass through the corner joining elements and engage in a plurality of threaded holes provided in a plurality of inserts provided in the undercut longitudinal grooves in both the connecting longitudinal section and in the connecting vertical section.

8. A framework according to claim 7, wherein the connecting longitudinal section contains at least two outer side faces that run parallel to the inner side plane and are displaced with respect to each other perpendicular to the inner side plane by a step running in the longitudinal direction of the connecting longitudinal section, whereby the side faces displaced towards the interior of the vehicle superstructure contain at least one undercut longitudinal groove which overlaps the connecting vertical section and the side face displaced towards the exterior of the vehicle superstructure lie flush with the outer face of the connecting vertical section.

9. A framework according to claim 8, wherein the connecting longitudinal section is a roof strut and the roof strut contains a first flange and a second, preferably shortened, outer flange, both flanges form an angle-shaped recess to accommodate an end part of the connecting vertical section and, at least one of the flanges, on the side face facing the connecting vertical section, have at least one undercut longitudinal groove for attaching the connecting vertical section to the roof strut by means of corner joining elements.

10. A framework according to claim 9, wherein the connecting vertical section is joined to the roof strut via one or two corner joining elements and the corner joining element is attached to the connecting vertical section and to the first and second flanges of the roof strut, whereby screws pass through the corner joining element and engage in the threaded hole in inserts introduced into the undercut longitudinal grooves in the first flange and the second flange and in the undercut longitudinal groove in the connecting vertical section.

11. A framework according to claim 8, wherein the connecting longitudinal section is a floor strut and the floor strut contains a first, extended flange and a second, shortened, outer flange, and both flanges form an angle-shaped recess to accommodate an end part of the connecting vertical section and, at least one of the flanges, on the side face directed towards the connecting vertical section have at least one undercut longitudinal groove for attaching the connecting vertical section to the floor strut by means of corner joining elements.

12. A framework according to claim 11, wherein the connecting vertical section is joined to the floor strut, via one or two corner joining elements, and the corner joining element is attached to the vertical section and to the first and second flanges of the floor strut, whereby screws pass through the corner joining elements and engage in the threaded hole in inserts introduced into the undercut longitudinal grooves in the first flange and the second flange and in the undercut longitudinal groove in the connecting vertical section.

13. A framework according to claim 1, wherein the connecting longitudinal section is a middle strut and the middle strut is T-shaped and contains a central, elevated box-shaped section part and two side flanges with outer side faces displaced towards the interior of the vehicle, whereby in the outer side face of the section flanges at least one undercut longitudinal groove is provided for attaching the connecting vertical section to the middle strut and the connecting vertical section is divided into two section parts, whereby the central part of the middle strut passes between the two section parts and the end faces of both section parts laterally butt against the central part and the middle strut with its two flanges crosses behind the section parts.

14. A framework according to claim 13, wherein the connecting vertical section is joined to the middle strut via corner joining elements, and the corner joining elements are attached to the connecting vertical section and the section flanges and the central section part, whereby screws pass through the corner joining elements and engage in threaded holes in inserts introduced into the undercut longitudinal grooves in the connecting vertical section, the section flanges and the central section part.

15. A framework according to claim 13, wherein the outer side faces of the central section part and the vertical post are flush with each other.

16. A framework according to claim 1, characterised in that the connecting vertical section crossing the connecting longitudinal section is continuous.

17. A framework according to claim 1, wherein one or more profile attachment elements are attached to the outer face of the connecting longitudinal section between two vertical sections, whereby the outer faces of the profile attachment elements and the vertical sections lie flush with each other.

18. A framework according to claim 17, wherein the profile attachment elements are attached to the connecting longitudinal section via screws which pass through the attachment element and engage in the threaded hole in inserts introduced into the undercut longitudinal groove or longitudinal grooves in the connecting longitudinal section.

19. A framework according to claim 18, wherein the profile attachment elements are corner joining elements and the connecting vertical section is attached to the longitudinal section at least in part via the profile attachment elements.

20. A framework according to claim 17, wherein the profile attachment elements contain groove-shaped connection points for attaching panel-type elements and cladding parts.

21. A framework according to claim 2, wherein the insert is a parallelogram-shaped clamping plate that can be rotated into place in the undercut longitudinal groove.

22. A framework according to claim 2, wherein the insert is introduced sideways into the undercut longitudinal groove and can accommodate a plurality of screw connections.

* * * * *